United States Patent [19]

Mitchell et al.

[11] Patent Number: 4,707,461

[45] Date of Patent: Nov. 17, 1987

[54] VANADIUM PASSIVATION IN A HYDROCARBON CATALYTIC CRACKING PROCESS

[75] Inventors: Bruce R. Mitchell, Cross Keys Village, Md.; Roger F. Vogel, Jefferson Township, Butler County, Pa.

[73] Assignee: Chevron Research Company, San Francisco, Calif.

[21] Appl. No.: 792,725

[22] Filed: Oct. 30, 1985

Related U.S. Application Data

[63] Continuation of Ser. No. 608,019, May 7, 1984, abandoned, which is a continuation-in-part of Ser. No. 536,754, Sep. 28, 1983, Pat. No. 4,451,355.

[51] Int. Cl.$^4$ ............................................. B01J 29/06
[52] U.S. Cl. ...................................... 502/64; 502/69; 502/250; 502/521; 208/113; 208/120
[58] Field of Search ................... 502/64, 69, 250, 340

[56] References Cited

U.S. PATENT DOCUMENTS

| | | | |
|---|---|---|---|
| 3,409,541 | 11/1968 | Flanders et al. | 208/120 |
| 3,699,037 | 10/1972 | Annesser et al. | 208/120 |
| 4,280,895 | 7/1981 | Stuntz et al. | 208/113 |
| 4,481,101 | 11/1984 | Yan | 208/50 |

FOREIGN PATENT DOCUMENTS

WO/8203225  9/1982  PCT Int'l Appl. .................. 502/62

Primary Examiner—Olik Chaudhuri
Attorney, Agent, or Firm—S. R. LaPaglia; T. G. DeJonghe; Q. T. Dickinson

[57] ABSTRACT

Hydrocarbons containing vanadium are converted to lower boiling fractions employing a zeolitic cracking catalyst containing a significant concentration of a calcium-containing additive e.g. calcium corbonate dolomite and amorphous as a vanadium passivating calcium silicate agent.

2 Claims, No Drawings

VANADIUM PASSIVATION IN A HYDROCARBON CATALYTIC CRACKING PROCESS

This is a continuation of application Ser. No. 608,019, filed May 7, 1984, now abandoned, which is a continuation-in-part of Ser. No. 536,754 filed Sept. 28, 1983, now U.S. Pat. No. 4,451,355.

FIELD OF INVENTION

This invention relates to an improved catalyst, the preparation, and a process for its use in the conversion of hydrocarbons to lower boiling fractions. More particularly, the invention is related to the use of a catalyst composition comprising a catalytically active crystalline aluminosilicate zeolite dispersed within a matrix and containing a calcium-containing additive to passivate vanadium deposited on the catalyst during the conversion reaction.

BACKGROUND OF THE INVENTION

Crystalline aluminosilicate zeolites dispersed into a matrix of amorphous and/or amorphous/kaolin materials have been employed in the catalytic cracking of hydrocarbons for many years. The poisonous effects of metals contained in the feedstock when, for example, a gas oil is converted to gasoline range boiling fractions, in lowering catalyst activity and selectivity for gasoline production and in reducing catalyst life have been described in the literature.

Initially, these adverse effects were avoided or controlled by charging feedstocks boiling below about 1050° F. and having total metal concentrations below 1 ppm. As the need for charging heavier feedstocks having higher concentrations of metals increased, additives such as antimony, tin, barium, manganese, bismuth calcium and magnesium have been employed to mitigate the poisonous effects of metal contaminants nickel, vanadium and iron contained in the catalytic cracking process feedstocks. Reference is made to U.S. Pat. Nos. 3,711,422; 3,977,963; 4,101,417; 4,377,494; and 4,432,890 as illustrative of such passivation procedures.

SUMMARY OF THE INVENTION

In accordance with the invention there is provided a catalyst comprising (1) a crystalline aluminosilicate zeolite, (2) a clay or synthetic inorganic refractory oxide matrix, and (3) an effective vanadium-passivating concentration of a calcium-containing additive selected from the group consisting of calcium carbonate, calcium silicate and dolomite.

Further, there is provided an improved process for the conversion of a vanadium-containing hydrocarbonaceous oil to lower boiling hydrocarbon products employing the above described catalyst.

DESCRIPTION OF THE PREFERRED EMBODIMENT

The catalyst composition of the present invention will comprise a crystalline aluminosilicate zeolite, a matrix material, and an effective vanadium-passivating concentration of the calcium-containing additive.

The crystalline aluminosilicate zeolite component of the present invention can be generally characterized as being a crystalline, three-dimensional, stable structure containing a large number of uniform openings or cavities interconnected by relatively uniform channels. The formula for the zeolites can be represented as follows:

$$xM_{2/n}O:Al_2O_3:1.5\text{-}6.5\ SiO_2:yH_2O$$

where M is a metal cation and n its valence; x varies from 0 to 1; and y is a function of the degree of dehydration and varies from 0 to 9. M is preferably a rare earth metal cation such as lanthanum, cerium, praseodymium, neodymium or mixtures thereof.

Zeolites which can be employed in the practice of this invention include both natural and synthetic zeolites. These natural occurring zeolites include gmelinite, chabazite, dachiardite, clinoptilolite, faujasite, heulandite, analcite, levynite, erionite, sodalite, cancrinite, nepheline, lazurite, scolecite, natrolite, offretite, mesolite, mordenite, brewsterite, ferrierite, and the like. Suitable synthetic zeolites which can be employed in the inventive process include zeolites X, Y, A, L, ZK-4, B, E, F, H, J, M, Q, T, W, Z, alpha and beta, ZSM-types and omega. The effective pore size of synthetic zeolites are suitably between 6 and 15 A in diameter. The term "zeolites" as used herein contemplates not only aluminosilicates but substances in which the aluminum is replaced by gallium and substances in which the silicon is replaced by germanium or phosphorous and other zeolites such as ultrastable Y. The preferred zeolites are the synthetic faujasites of the types Y and X or mixtures thereof.

It is also well known in the art that to obtain good cracking activity the zeolites must be in good cracking form. In most cases this involves reducing the alkali metal content of the zeolite to as low a level as possible, as a high alkali metal content reduces the thermal structural stability, and the effective lifetime of the catalyst is impaired. Procedures for removing alkali metals and putting the zeolite in the proper form are known in the art.

The crystalline alkali metal aluminosilicate can be cation-exchanged by treatment with a solution essentially characterized by a pH in excess of about 4.5, preferably by a pH in excess of 5, and containing an ion capable of replacing the alkali metal and activating the catalyst. The alkali metal content of the finished catalyst should be less than about 1 and preferably less than about 0.5 percent by weight. The cation-exchange solution can be contacted with the crystalline aluminosilicate of uniform pore structure in the form of a fine powder, a compressed pellet, extruded pellet, spheroidal bead or other suitable particle shapes. Desirably, the zeolite comprises from about 3 to about 35, preferably from about 5 to about 25 weight percent of the total catalyst.

The zeolite is incorporated into a matrix. Suitable matrix materials include the naturally occurring clays, such as kaolin, halloysite and montmorillonite and inorganic oxide gels comprising amorphous catalytic inorganic oxides such as silica, silica-alumina, silica-zirconia, silica-magnesia, alumina-boria, alumina-titania, and the like, and mixtures thereof. Preferably the inorganic oxide gel is a silica-containing gel, more preferably the inorganic oxide gel is an amorphous silica-alumina component, such as a conventional silica-alumina cracking catalyst, several types and compositions of which are commercially available. These materials are generally prepared as a co-gel of silica and alumina or as alumina precipitated on a pre-formed and pre-aged hydrogel. In general, silica is present as the major component in the catalytic solids present in such gels, being present in amounts ranging between about 55 and 100 weight percent, preferably the silica will be present in amounts ranging from about 70 to about 90 weight percent. The matrix component may suitably be present in the catalyst of the present invention in an amount ranging from about 55 to about 92 weight percent, preferably from about 60 to about 80 weight percent, based on the total catalyst.

A catalytically inert porous material may also be present in the finished catalyst. The term "catalytically inert" refers to a porous mafterial having substantially no catalytic activity or less catalytic activity than the inorganic gel component or the clay component of the catalyst. The inert porous component can be an absorptive bulk material which has been pre-formed and placed in a physical form such that its surface area and pore structure are stabilized. When added to an impure inorganic gel containing considerable amounts of residual soluble salts, the salts will not alter the surface pore characteristics measurably, nor will they promote chemical attack on the pre-formed porous inert material. Suitable inert porous materials for use in the catalyst of the present invention include alumina, titania, silica, zirconia, magnesia, and mixtures thereof. The porous inert material, when used as a component of the catalyst of the present invention, is present in the finished catalyst in an amount ranging from about 10 to about 30 weight percent based on the total catalyst.

The calcium additive component of the catalyst of this invention is selected from the group consisting of calcium carbonate, a substantially amorphous calcium silicate and dolomite wherein the atomic ratio of calcium to magnesium is at least 0.5. Substantially amorphous calcium silicate having the composition of $CaSi_2O_5$ can be produced synthetically.

The calcium-containing additive is a separate and discrete component of the finished catalyst and acts as a sink for vanadium during use in the cracking unit and thereby protects the active zeolite component.

When fresh hydrocarbon feed contacts catalyst in the cracking zone, cracking and coking reactions occur. At this time, vanadium is quantitatively deposited on the catalyst. Spent catalyst containing vanadium deposits passes from the cracking unit to the regenerator where temperatures normally in the range of 1150°–1400° F. (621° to 760° C.) are encountered in an oxygen-containing environment. Conditions are therefore suitable for vanadium migration to and reaction with the active zeolitic component of the catalyst. The reaction results in formation of mixed metal oxides containing vanadium which causes irreversible structural collapse of the crystalline zeolite. Upon degradation, active sites are destroyed and catalytic activity declines. Activity can be maintained only by adding large quantities of fresh catalyst at great expense to the refiner.

It is theorized that addition of the calcium-containing additive prevents the vanadium interaction with the zeolite by acting as a sink for vanadium. In the regenerator, vanadium present on the catalyst particles preferentially reacts with the calcium-containing passivator. Competitive reactions are occurring and the key for successful passivation is to utilize an additive with a significantly greater rate of reaction toward vanadium than that displayed by the zeolite. As a result, the vanadium is deprived of its mobility, and the zeolite is protected from attack and eventual collapse. It is believed that vanadium and the calcium additives form one or more new binary oxides. The overall result is greatly increased levels of permissible vanadium and lower fresh catalyst make-up rates. The concentration of the calcium additive in the catalyst of this invention will range from about 5 to about 40, preferably from 10 to 25, weight percent based on the total catalyst.

The catalyst of the present invention can be prepared by any one of several conventional methods. One method comprises making an inorganic oxide hydrogel and separate aqueous slurries of the zeolite component, the calcium additive and if desired, the porous catalytically inert component. The slurries can then be blended into the hydrogel, and the mixture homogenized. The resulting homogeneous mixture can be spray-dried and washed free of extraneous soluble salts using, for example, a dilute ammonium sulfate solution and water. After filtering, the resulting catalyst is calcined to reduce the volatile content to less than 12 weight percent.

The catalyst composition of this invention is employed in the cracking of vanadium-containing charge stocks to produce gasoline and light distillate fractions from heavier hydrocarbon feedstocks. The charge stocks generally are those having an average boiling temperature above 600° F. (316° C.) and include materials such as gas oils, cycle oils, residuums and the like.

The charge stocks employed in the process of this invention can contain significantly higher concentrations of vanadium than those employed in the conventional catalytic cracking processes, as the catalyst of this invention is effective in cracking processes operated at vanadium contaminant levels in excess of 4,000 ppm, even exceeding 30,000 ppm. Thus, the charge stocks to the catalytic cracking process of this invention can contain vanadium contaminants up to 3.5 ppm and higher with no significant reduction in effective catalyst life when compared with conventional catalytic cracking processes wherein the concentration of vanadium contaminants in the charge stock is controlled at a level of less than 1.5 ppm.

Although not to be limited thereto, a preferred method of employing the catalyst of this invention is by fluid catalytic cracking using riser outlet temperatures between about 900° to about 1100° F. (482° to 593° C.). Under fluid catalytic cracking conditions, the cracking occurs in the presence of a fluidized composited catalyst in an elongated reactor tube commonly referred to as a riser. Generally, the riser has a length-to-diameter ratio of about 20, and the charge stock is passed through a preheater, which heats the charge stock to a temperature of at least 400° F. (204° C.). The heated charge stock is then introduced into the bottom of the riser.

In operation, a contact time (based on feed) of up to 15 seconds and catalyst-to-oil weight ratios of about 4:1 to about 15:1 are employed. Steam can be introduced into the oil inlet line to the riser and/or introduced independently to the bottom of the riser so as to assist in carrying regenerated catalyst upward through the riser.

The riser system at a pressure in the range of about 5 to about 50 psig (135 kPa to 446 kPa) is normally operated with catalyst and hydrocarbon feed flowing concurrently into and upward into the riser at about the same velocity, thereby avoiding any significant slippage of catalyst relative to hydrocarbon in the riser and avoiding formation of the catalyst bed in the reaction flowstream.

The catalyst containing metal contaminants and carbon is separated from the hydrocarbon product effluent withdrawn from the reactor and passed to regenerator. In the regenerator, the catalyst is heated to a temperature in the range of about 800° to about 1800° F. (427° to 982° C.), preferably 1150° to 1400° F. (621° to 760° C.) for a period of time ranging from three to thirty minutes in the presence of an oxygen-containing gas. This burning step is conducted so as to reduce the concentration of the carbon on the catalyst to less than 0.3 weight percent by conversion of the carbon to carbon oxide and carbon dioxide.

The components of the novel catalyst system need not be introduced together into the reactor. The crystalline aluminosilicate and matrix (catalytically active component) can be introduced separately from the calcium additive component.

The relative amounts of the catalytically active and diluent components introduced into the system as makeup can be adjusted so as to increase the concentration of the diluent in the riser and in the system as the concentration of metal contaminants in the cracking zone increases. Accordingly, with the diluent acting as a scavenger for the metal contaminants, preventing such contaminants from reaching the cracking centers of the catalytically active component, the concentration of the diluent in the makeup catalyst can be adjusted so as to maintain a desired conversion, preferably a conversion of at least 55 percent. Percent conversion is the difference between the volume of the fresh feed and the volume of the product boiling above 400° F. divided by the volume of the fresh feed multiplied by 100. The concentration of the diluent component in the cracking zone can be adjusted so as to maintain a conversion of at least 55 percent when the cracking catalyst composite (catalytically active component plus diluent) contains vanadium contaminant concentrations in the range of 4000 to 30,000 ppm (based upon the weight of the catalyst composite).

The following examples are presented to illustrate objectives and advantages of the invention. However, it is not intended that the invention should be limited to the specific embodiments presented therein.

EXAMPLE 1

It is known in the art that the presence of calcium and other Group IIA metals and their salts in a catalytic cracking process may result in excessive neutralization of acidic sites on the catalyst, degrading or neutralizing zeolites. Thus, the art would say that the use of calcium and its salts in the hydrocarbon catalytic cracking process is to be avoided in the high conversion of gas oil and heavier feedstocks to gasoline.

Surprisingly, it was discovered that calcium carbonate could be employed to passivate vanadium contained in the feed to the cracking process without the excessive neutralization of the acidic sites. In demonstrating this unique quality, calcium carbonate, calcium nitrate, calcium sulfate, calcium sulfite, calcium chloride, and calcium phosphate salts were separately blended at the 15 weight percent level with rare earth exchanged Y type zeolite (REY) and halloysite clay to prepare six finished catalyst compositions.

The catalyst compositions were prepared by combining 65 weight percent halloysite, 20 weight percent of a rare earth exchanged Y zeolite, and 15 weight percent of the calcium salt and wet mixing in water for a period of time to provide a homogeneous mixture. The mixture was filtered and the cake dried for 24 hours at 120° C. The dried catalyst was sized through 100 mesh and heat shocked by heating the catalyst in a furnace for one hour at 1100° F. (593° C.).

In the preparation of a catalyst containing vanadium as a contaminant, vanadium naphthenate was dissolved in benzene. The above-prepared catalyst was impregnated with the solution by incipient wetness and dried for twenty hours at 120° C. The catalyst was then calcined for 10 hours at 538° C. Additional vanadium naphthenate was dissolved in benzene and the catalyst impregnated with this solution and the drying and calcining steps repeated to obtain a catalyst having the desired concentration of vanadium as a contaminant. The catalyst was then sized to 100–200 mesh.

The catalyst of this and subsequent examples were evaluated in a microactivity test unit. Prior to testing, the catalysts were steamed at 1350° F. (732° C.) for 14 hours at atmospheric pressure to simulate equilibrium surface area and activity. Catalytic cracking conditions were 960° F. (516° C.), a space velocity of 16.0 WHSV and a catalyst to oil ratio of 3.0. The gas oil feed to the reactor in this and subsequent examples was characterized as follows:

| Gravity, °API | 27.9 |
|---|---|
| Sulfur, wt % | 0.59 |
| Nitrogen, wt % | 0.09 |
| Carbon Residue, wt % | 0.33 |
| Aniline Point, °F. | 190.2 |
| Nickel, ppm | 0.3 |
| Vanadium, ppm | 0.3 |
| Vacuum Distillation, °F. | |
| 10% at 760 mm Hg | 595 |
| 30% at 760 mm Hg | 685 |
| 50% at 760 mm Hg | 765 |
| 70% at 760 mm Hg | 846 |
| 90% at 760 mm Hg | 939 |

The results obtained by employing catalysts containing 15 weight percent of the designated calcium salt and vanadium contamination levels of 10,000 and 20,000 ppm are shown below in Tables I and II in comparison with the results obtained under the same conditions using catalysts prepared as described above with the exception that the catalysts did not contain vanadium as a contaminant:

TABLE I

| | Run No. 1 | Run No. 2 | Run No. 3 | Run No. 4 | Run No. 5 | Run No. 6 | Run No. 7 | Run No. 8 | Run No. 9 |
|---|---|---|---|---|---|---|---|---|---|
| Salt | $CaCO_3$ | $CaCO_3$ | $CaCO_3$ | $CaSO_4$ | $CaSO_4$ | $CaSO_4$ | $CaSO_3$ | $CaSO_3$ | $CaSO_3$ |
| Vanadium, ppm | 0 | 10,000 | 20,000 | 0 | 10,000 | 20,000 | 0 | 10,000 | 20,000 |
| Conversion, Vol. % | 82.50 | 78.68 | 74.54 | 82.50 | 53.10 | 22.37 | 84.15 | 66.12 | 34.26 |
| Product yields, Vol. % | | | | | | | | | |
| Total $C_3$ | 10.25 | 8.64 | 7.41 | 12.61 | 5.12 | 1.69 | 16.90 | 6.16 | 2.47 |
| Propane | 2.34 | 2.15 | 1.14 | 5.96 | 1.36 | 0.56 | 9.72 | 1.40 | 0.53 |
| Propylene | 7.91 | 6.49 | 6.28 | 6.65 | 3.76 | 1.14 | 7.18 | 4.76 | 1.94 |
| Total $C_4$ | 17.62 | 15.05 | 13.68 | 18.30 | 8.09 | 1.25 | 20.82 | 10.73 | 3.12 |
| I-butane | 8.63 | 7.25 | 5.54 | 10.33 | 3.23 | 0.22 | 12.14 | 4.44 | 0.94 |
| N—butane | 2.15 | 1.82 | 1.27 | 3.17 | 0.93 | 0.17 | 4.01 | 1.11 | 1.31 |
| Total butenes | 6.84 | 5.98 | 6.87 | 4.80 | 3.93 | 0.86 | 4.67 | 5.18 | 1.87 |
| $C_5$-430° F. Gaso | 60.97 | 60.49 | 56.61 | 62.02 | 40.23 | 16.72 | 57.95 | 53.05 | 26.29 |

TABLE I-continued

|  | Run No. 1 | Run No. 2 | Run No. 3 | Run No. 4 | Run No. 5 | Run No. 6 | Run No. 7 | Run No. 8 | Run No. 9 |
|---|---|---|---|---|---|---|---|---|---|
| 430–650° F. LCGO | 13.84 | 16.10 | 18.92 | 13.49 | 24.94 | 30.42 | 11.93 | 22.13 | 29.54 |
| 650° F. + DO | 3.66 | 5.21 | 6.54 | 4.01 | 21.96 | 47.22 | 3.92 | 11.75 | 36.20 |
| $C_3$ + Liq. Rec. | 106.35 | 105.50 | 103.16 | 110.42 | 100.35 | 97.29 | 111.52 | 103.80 | 97.62 |
| FCC Gaso + Alk | 86.96 | 82.47 | 79.82 | 82.14 | 53.79 | 20.22 | 78.76 | 70.59 | 33.01 |
| Product Yields, wt % | | | | | | | | | |
| $C_2$ and lighter | 3.10 | 2.61 | 2.61 | 3.62 | 2.31 | 3.64 | 3.22 | 3.34 | 2.91 |
| $H_2$ | 0.10 | 0.24 | 0.28 | 0.11 | 0.60 | 0.57 | 0.13 | 0.52 | 0.61 |
| $H_2S$ | 0.00 | 0.00 | 0.00 | 0.00 | 0.00 | 0.00 | 0.00 | 0.00 | 0.00 |
| Methane | 1.07 | 0.84 | 0.81 | 0.81 | 0.62 | 0.37 | 0.94 | 0.64 | 0.43 |
| Ethane | 0.95 | 0.76 | 0.81 | 1.12 | 0.57 | 0.99 | 0.99 | 1.03 | 0.81 |
| Ethylene | 0.98 | 0.77 | 0.71 | 1.58 | 0.52 | 1.71 | 1.16 | 1.15 | 1.06 |
| Carbon | 5.09 | 5.37 | 4.32 | 5.97 | 5.53 | 4.49 | 8.28 | 4.89 | 4.67 |

TABLE II

|  | Run No. 10 | Run No. 11 | Run No. 12 | Run No. 13 | Run No. 14 | Run No. 15 | Run No. 16 | Run No. 17 | Run No. 18 |
|---|---|---|---|---|---|---|---|---|---|
| Salt | $Ca(NO_3)_2$ | $Ca(NO_3)_2$ | $Ca(NO_3)_2$ | $CaCl_2$ | $CaCl_2$ | $CaCl_2$ | $CaHPO_4$ | $CaHPO_4$ | $CaHPO_4$ |
| Vanadium, ppm | 0 | 10,000 | 20,000 | 0 | 10,000 | 20,000 | 0 | 10,000 | 20,000 |
| Conversion, Vol. % | 80.27 | 59.54 | 53.98 | 82.50 | 65.44 | 60.44 | 79.64 | 57.45 | 30.96 |
| Product yields, Vol. | | | | | | | | | |
| Total $C_3$ | 10.69 | 5.15 | 4.18 | 12.18 | 6.53 | 6.03 | 10.20 | 6.54 | 2.69 |
| Propane | 3.96 | 1.10 | 0.87 | 4.86 | 2.05 | 1.79 | 3.77 | 1.89 | 0.67 |
| Propylene | 6.73 | 4.05 | 3.31 | 7.33 | 4.48 | 4.24 | 6.42 | 4.65 | 2.02 |
| Total $C_4$ | 17.26 | 8.99 | 7.04 | 18.70 | 10.83 | 9.77 | 16.60 | 9.17 | 2.60 |
| I-butane | 9.12 | 3.45 | 2.65 | 10.10 | 4.89 | 4.29 | 9.37 | 4.15 | 0.76 |
| N-butane | 2.51 | 0.88 | 0.70 | 2.95 | 1.34 | 1.14 | 2.59 | 1.15 | 0.26 |
| Total butenes | 5.63 | 4.66 | 3.69 | 5.65 | 4.60 | 4.34 | 4.64 | 3.87 | 1.58 |
| $C_5$–430° F. Gaso | 60.63 | 47.97 | 41.08 | 62.01 | 52.01 | 45.19 | 60.91 | 44.06 | 24.08 |
| 430–650° F. LCGO | 14.57 | 24.10 | 26.04 | 13.47 | 22.60 | 22.50 | 14.99 | 21.95 | 29.29 |
| 650° F. + DO | 5.16 | 16.36 | 19.98 | 4.03 | 11.96 | 17.07 | 5.37 | 20.60 | 39.75 |
| $C_3$ + Liq. Rec. | 108.31 | 102.57 | 98.31 | 110.39 | 103.94 | 100.55 | 108.08 | 102.32 | 98.42 |
| FCC Gaso + Alk | 82.38 | 63.35 | 53.44 | 84.83 | 68.04 | 60.33 | 80.37 | 59.05 | 30.42 |
| Product Yields, wt % | | | | | | | | | |
| $C_2$ and lighter | 3.23 | 3.07 | 3.24 | 3.04 | 4.28 | 2.37 | 2.84 | 2.79 | 2.03 |
| $H_2$ | 0.12 | 0.53 | 0.68 | 0.10 | 0.61 | 0.68 | 0.10 | 0.57 | 0.55 |
| $H_2S$ | 0.00 | 0.00 | 0.00 | 0.00 | 0.00 | 0.00 | 0.0 | 0.0 | 0.0 |
| Methane | 0.75 | 0.57 | 0.49 | 0.94 | 0.60 | 0.56 | 0.92 | 0.79 | 0.52 |
| Ethane | 1.06 | 0.92 | 0.90 | 0.93 | 1.23 | 0.53 | 0.91 | 0.77 | 0.50 |
| Ethylene | 1.30 | 1.05 | 1.17 | 1.07 | 1.84 | 0.61 | 0.90 | 0.66 | 0.47 |
| Carbon | 5.27 | 4.66 | 5.47 | 5.74 | 5.75 | 6.41 | 5.60 | 5.64 | 4.68 |

From the above, the unique effectiveness of calcium carbonate to passivate vanadium is demonstrated by a conversion of 74.54 percent at a vanadium contaminant concentration of 20,000 ppm. Correspondingly, the conversion percentage for calcium sulfate, calcium sulfite, calcium nitrate, calcium chloride and calcium phosphate were 22.37, 34.26, 53.98, 60.44 and 30.96, respectively.

EXAMPLE 2

The runs of Example 1 were repeated employing catalysts prepared by the procedure of Example 1 with the exception that 15 weight percent of a substantially crystalline $CaSiO_3$ (Wollastonite) was substituted for the calcium salt in Runs 19, 20, 21 and 22; and 15 weight percent of a substantially amorphous $CaSi_2O_5$ (Mansville Corp.-Micro-Cel E) was substituted for the calcium salt in Runs 23, 24, 25 and 26. Runs 20 and 24 were conducted at a catalyst vanadium contaminant concentration level of 5,000 ppm; Runs 21 and 25 were conducted at a catalyst vanadium contaminant concentration level of 10,000 ppm; and Runs 22 and 26 were conducted at a catalyst vanadium contaminant concentration level of 20,000 ppm. The results are shown below in Table III:

TABLE III

|  | Run No. 19 | Run No. 20 | Run No. 21 | Run No. 22 | Run No. 23 | Run No. 24 | Run No. 25 | Run No. 26 |
|---|---|---|---|---|---|---|---|---|
| Salt | $CaSiO_3$ | $CaSiO_3$ | $CaSiO_3$ | $CaSiO_3$ | $CaSi_2O_5$ | $CaSi_2O_5$ | $CaSi_2O_5$ | $CaSi_2O_5$ |
| Vanadium, ppm | 0 | 5,000 | 10,000 | 20,000 | 0 | 5,000 | 10,000 | 20,000 |
| Conversion, Vol. % | 78.76 | 71.33 | 59.74 | 44.97 | 79.99 | 75.47 | 70.53 | 69.33 |
| Product yields, Vol. % | | | | | | | | |
| Total $C_3$ | 9.94 | 3.79 | 5.96 | 3.78 | 10.19 | 8.54 | 7.63 | 7.09 |
| Propane | 3.54 | 1.99 | 1.39 | 0.96 | 3.27 | 2.54 | 2.56 | 2.15 |
| Propylene | 6.40 | 1.79 | 4.57 | 2.82 | 6.91 | 6.00 | 5.07 | 4.94 |
| Total $C_4$ | 16.26 | 11.97 | 8.94 | 4.66 | 16.72 | 14.84 | 12.85 | 11.65 |
| I—butane | 8.86 | 5.09 | 3.29 | 1.62 | 8.83 | 7.78 | 6.82 | 5.66 |
| N—butane | 2.51 | 1.29 | 0.86 | 0.48 | 2.34 | 1.96 | 1.75 | 1.46 |
| Total butenes | 4.89 | 5.59 | 4.79 | 2.57 | 5.54 | 5.09 | 4.28 | 4.53 |
| $C_5$–430° F. Gaso | 60.38 | 55.05 | 46.58 | 32.79 | 62.26 | 62.09 | 56.63 | 56.35 |
| 430–650° F. LCGO | 15.22 | 20.14 | 23.42 | 26.44 | 14.32 | 17.90 | 19.46 | 20.84 |
| 650° F. + DO | 6.02 | 8.53 | 16.84 | 28.59 | 5.69 | 6.63 | 10.00 | 9.82 |

TABLE III-continued

|  | Run No. 19 | Run No. 20 | Run No. 21 | Run No. 22 | Run No. 23 | Run No. 24 | Run No. 25 | Run No. 26 |
|---|---|---|---|---|---|---|---|---|
| $C_3$ + Liq. Rec. | 107.81 | 99.48 | 101.73 | 96.27 | 109.18 | 109.99 | 106.58 | 105.76 |
| FCC Gaso + Alk | 80.22 | 68.23 | 63.09 | 42.29 | 84.18 | 81.63 | 73.10 | 73.04 |
| Product Yields, wt % |  |  |  |  |  |  |  |  |
| $C_2$ and lighter | 2.78 | 2.94 | 2.60 | 2.43 | 2.68 | 2.23 | 2.25 | 2.40 |
| $H_2$ | 0.12 | 0.53 | 0.53 | 0.66 | 0.12 | 0.15 | 0.21 | 0.48 |
| $H_2S$ | 0.0 | 0.0 | 0.0 | 0.0 | 0.0 | 0.0 | 0.0 | 0.0 |
| Methane | 0.86 | 0.81 | 0.68 | 0.60 | 0.88 | 0.68 | 0.74 | 0.64 |
| Ethane | 0.85 | 0.84 | 0.71 | 0.60 | 0.79 | 0.68 | 0.65 | 0.65 |
| Ethylene | 0.95 | 0.76 | 0.69 | 0.57 | 0.89 | 0.74 | 0.66 | 0.63 |
| Carbon | 6.18 | 5.44 | 4.63 | 5.97 | 6.01 | 5.57 | 5.88 | 6.27 |

The surprising effectiveness of $CaSi_2O_5$ to passivate vanadium is demonstrated from the above data showing a conversion percentage of 44.97 percent for $CaSiO_3$ and 69.33 percent for $CaSi_2O_5$ at vanadium contamination levels of 20,000 ppm.

EXAMPLE 3

The runs of Example 1 were repeated, with the exception that 15 weight percent dolomite having an atomic ratio of calcium to magnesium of 1.2 (Agstone manufactured by C. E. Basic, Inc.) was substituted in each run for the calcium salt in preparation of the catalysts employing the procedure of Example 1. The results are presented below in Table IV:

TABLE IV

|  | Run No. 27 | Run No. 28 | Run No. 29 |
|---|---|---|---|
| Vanadium, ppm | 0 | 10,000 | 20,000 |
| Conversion, Vol. % | 82.20 | 76.80 | 72.66 |
| Product Yields, Vol. % |  |  |  |
| Total $C_3$ | 10.97 | 8.55 | 7.60 |
| Propane | 4.30 | 1.96 | 1.87 |
| Propylene | 6.67 | 6.58 | 5.73 |
| Total $C_4$ | 16.99 | 15.59 | 13.32 |
| I-butane | 9.25 | 7.40 | 6.10 |
| N-butane | 2.71 | 1.87 | 1.51 |
| Total butenes | 5.03 | 6.32 | 5.72 |
| $C_5$-430° F. Gaso | 64.12 | 61.39 | 59.03 |
| 430-650° F. LCGO | 13.78 | 16.93 | 19.31 |
| 650° F. + DO | 4.02 | 6.27 | 8.02 |
| $C_3$ + Liq. Rec. | 109.88 | 108.73 | 107.28 |
| FCC Gaso + Alk | 84.69 | 84.15 | 79.22 |
| Product Yields, wt % |  |  |  |
| $C_2$ and lighter | 2.79 | 3.71 | 2.96 |
| $H_2$ | 0.08 | 0.17 | 0.31 |
| $H_2S$ | 0.00 | 0.00 | 0.00 |
| Methane | 0.80 | 0.73 | 0.67 |
| Ethane | 0.90 | 1.26 | 0.95 |
| Ethylene | 1.01 | 1.56 | 1.03 |
| Carbon | 4.92 | 4.20 | 4.37 |

When employing dolomite as the vanadium scavenger, the conversion percentage dropped only from 82.20 to 72.66 with increasing the vanadium contaminant concentration up to 20,000 ppm. Advantageously, the concentration of carbon on the catalyst decreased from 4.92 to 4.37 weight percent.

EXAMPLE 4

The runs of Example 3 were repeated with the exception that the dolomite had an atomic ratio of calcium to magnesium of 3.6. The results are shown below in Table V:

TABLE V

|  | Run No. 30 | Run No. 31 | Run No. 32 |
|---|---|---|---|
| Vanadium, ppm | 0 | 10,000 | 20,000 |
| Conversion, Vol. % | 79.84 | 75.50 | 68.62 |
| Product yields, Vol. % |  |  |  |
| Total $C_3$ | 10.43 | 8.61 | 6.32 |
| Propane | 3.25 | 2.47 | 1.02 |
| Propylene | 7.18 | 6.15 | 5.30 |
| Total $C_4$ | 17.97 | 15.62 | 12.31 |
| I-butane | 9.44 | 7.91 | 4.86 |
| N-butane | 2.49 | 1.97 | 1.09 |
| Total butenes | 6.05 | 5.74 | 6.36 |
| $C_5$-430° F. Gaso | 66.16 | 62.09 | 60.01 |
| 430-650° F. LCGO | 14.89 | 17.51 | 21.98 |
| 650° F. + DO | 5.27 | 7.00 | 9.40 |
| $C_3$ + Liq. Rec. | 114.73 | 110.82 | 110.02 |
| FCC Gaso + Alk | 89.45 | 83.04 | 80.63 |
| Product Yields, wt % |  |  |  |
| $C_2$ and lighter | 2.62 | 2.26 | 2.30 |
| $H_2$ | 0.09 | 0.17 | 0.39 |
| $H_2S$ | 0.00 | 0.00 | 0.00 |
| Methane | 0.82 | 0.69 | 0.65 |
| Ethane | 0.77 | 0.65 | 0.65 |
| Ethylene | 0.94 | 0.75 | 0.60 |
| Carbon | 5.25 | 4.89 | 3.96 |

From the above data the effectiveness of dolomite having an atomic ratio of calcium to magnesium of 3.6 to substantially negate contamination effects of vanadium up to a concentration of 20,000 ppm is demonstrated.

Obviously, modifications and variations of the invention, as hereinabove set forth, can be made without departing from the spirit and scope thereof, and therefore only such limitations should be imposed as are indicated in the appended claims.

We claim:

1. A catalyst composition comprising a crystalline aluminosilicate zeolite, a matrix material, and from 5 to 40 weight percent, based on the total catalyst, of a calcium-containing, substantially water-insoluble, additive which will not neutralize the acidic sites of the catalyst, said additive comprising substantially amorphous calcium silicate, said calcium-containing additive being a separate and discrete component of said catalyst composition.

2. The catalyst composition of claim 1 wherein the concentration of said calcium-containing additive is 10 to 25 weight percent, based on the total catalyst.

* * * * *

UNITED STATES PATENT AND TRADEMARK OFFICE
CERTIFICATE OF CORRECTION

PATENT NO. : 4,707,461

DATED : November 17, 1987

INVENTOR(S) : Bruce R. Mitchell and Roger F. Vogel

It is certified that error appears in the above-identified patent and that said Letters Patent are hereby corrected as shown below:

ABSTRACT: ".... containing a significant concentration of a calcium-containing additive e.g. calcium corbonate dolomite and amorphous as a vanadium passivating calcium silicate agent." should read --.... containing a significant concentration of a calcium-containing additive as a vanadium passivating agent.--

Signed and Sealed this

Twenty-first Day of June, 1988

Attest:

DONALD J. QUIGG

Attesting Officer      Commissioner of Patents and Trademarks